US010976221B2

(12) United States Patent
Turner et al.

(10) Patent No.: US 10,976,221 B2
(45) Date of Patent: Apr. 13, 2021

(54) MAGNETIC GAS TURBINE SENSOR

(71) Applicant: Weston Aerospace Limited, Farnborough (GB)

(72) Inventors: Nigel Turner, Farnborough (GB); Wojciech Konrad Kuiczyk, Farnborough (GB); James Ewing, Farnborough (GB)

(73) Assignee: WESTON AEROSPACE LIMITED, Farnborough (GB)

( * ) Notice: Subject to any disclaimer, the term of this patent is extended or adjusted under 35 U.S.C. 154(b) by 281 days.

(21) Appl. No.: 16/242,484

(22) Filed: Jan. 8, 2019

(65) Prior Publication Data
US 2019/0212229 A1 Jul. 11, 2019

(30) Foreign Application Priority Data
Jan. 9, 2018 (GB) ..................................... 1800330

(51) Int. Cl.
*G01M 15/14* (2006.01)
*G01P 3/49* (2006.01)
(Continued)

(52) U.S. Cl.
CPC ............. *G01M 15/14* (2013.01); *G01L 3/101* (2013.01); *G01L 3/105* (2013.01); *G01P 3/488* (2013.01); *G01P 3/49* (2013.01)

(58) Field of Classification Search
CPC .......... G01M 15/14; G01P 3/488; G01P 3/49; G01P 1/006; G01P 1/026; G01P 3/44; G01L 3/101; G01L 3/105; G01L 3/14
See application file for complete search history.

(56) References Cited

U.S. PATENT DOCUMENTS 3,984,713 A 1/1976 Presley
4,045,738 A 8/1977 Buzzell
(Continued)

FOREIGN PATENT DOCUMENTS

CH 368541 A 4/1963
EP 0169670 A 1/1986
(Continued)

OTHER PUBLICATIONS

GB Patent Application No. 1800330.1, Search Report under Section 17, dated Jul. 6, 2018, 2 pages.
(Continued)

*Primary Examiner* — Freddie Kirkland, III
(74) *Attorney, Agent, or Firm* — Fredrikson & Byron, P.A.

(57) ABSTRACT

A magnetic gas turbine sensor (25) for sensing the speed and/or torque of a shaft in a gas turbine engine, the sensor comprising a magnetically energisable pole piece (3), a magnet (2) associated with the pole piece and a conductive sensing element (4) wrapped or wound around the pole piece (3) and inductively coupled to the pole piece. The sensor includes a first sensor casing including a first inner fluid conduit (36) for fluid coolant, the first fluid conduit being inside the casing and running alongside and/or adjacent the pole piece, magnet and/or conductive sensing element, and the sensor also including a second sensor casing surrounding the first sensor casing and defining a second outer fluid conduit (37) for fluid coolant and at least partially surrounding the first fluid conduit. Fluid coolant may flow into the sensor at its proximal mounting end, through the first fluid conduit over or through the pole piece, magnet and/or conductive sensing element to the sensing end, and then through the second fluid conduit from the distal sensing end (29) to the outlet at the proximal mounting end (31).

13 Claims, 8 Drawing Sheets

(51) Int. Cl.
*G01P 3/488* (2006.01)
*G01L 3/10* (2006.01)

(56) References Cited

U.S. PATENT DOCUMENTS

| | | | |
|---|---|---|---|
| 5,166,626 A | 11/1992 | Hester et al. | |
| 5,446,269 A | 8/1995 | Peysakhovich | |
| 7,149,879 B2 | 12/2006 | Liang | |
| 7,170,284 B2* | 1/2007 | Roeseler | F01D 17/06 |
| | | | 324/207.25 |
| 8,549,931 B2* | 10/2013 | Bodin | G01P 3/488 |
| | | | 73/862.193 |
| 8,992,081 B2* | 3/2015 | Ireland | G01K 13/02 |
| | | | 374/179 |
| 9,551,281 B2* | 1/2017 | Lefebvre | F02C 7/12 |
| 9,733,131 B2* | 8/2017 | Ewing | G01K 7/02 |
| 9,778,145 B2* | 10/2017 | Walling | G01M 15/14 |
| 10,533,899 B2* | 1/2020 | Rudkin | G01K 1/20 |
| 2005/0280412 A1 | 12/2005 | Roeseler et al. | |
| 2014/0376593 A1* | 12/2014 | Ewing | G01K 1/20 |
| | | | 374/179 |
| 2015/0198091 A1 | 7/2015 | Lefebvre et al. | |
| 2017/0030779 A1 | 2/2017 | Rudkin | |

FOREIGN PATENT DOCUMENTS

| | | |
|---|---|---|
| EP | 1355131 A2 | 10/2003 |
| EP | 2023106 A2 | 2/2009 |
| EP | 2073021 A1 | 6/2009 |
| EP | 2400307 A1 | 12/2011 |
| EP | 3128332 A2 | 2/2017 |
| GB | 832242 A | 4/1960 |
| GB | 1386035 A | 3/1975 |
| GB | 2223103 A | 3/1990 |
| GB | 2265221 A | 9/1993 |
| GB | 2482468 A | 2/2012 |
| GB | 2522210 A | 7/2015 |
| GB | 2540770 A | 2/2017 |
| JP | S59175174 U | 11/1984 |
| JP | H05180857 A | 7/1993 |
| JP | 08100998 A | 4/1996 |
| JP | H09196530 A | 7/1997 |

OTHER PUBLICATIONS

Extended European Search Report in European Patent Application No. 19150844.9, dated Sep. 11, 2019; 13pgs.

EPO Machine Translation of Japanese Publication No. JPH09196530A, dated Jul. 31, 1997; 5pgs.

EPO Machine Translation of Japanese Patent No. JP3374549B2 (issued patent of Japanese Publication No. JPH08100998A), dated Feb. 4, 2003; 9pgs.

\* cited by examiner

MAGNETIC GAS TURBINE SENSOR

FIELD OF THE INVENTION

The invention relates to magnetic gas turbine sensors. In particular, embodiments of the invention relate to a cooled variable reluctance sensor for use in systems for determining the rotational speed of a gas turbine shaft, and may also be used in systems for determining if a shaft in the gas turbine engine has broken.

BACKGROUND

Magnetic sensors such as eddy current sensors and/or variable reluctance (VR) sensors are often used as part of speed and/or torque monitoring systems on a gas turbine engine. U.S. Pat. No. 4,045,738A, EP2400307A, EP3128332A, EP1355131A and EP2073021A describe examples of VR sensors. GB2482468A describes an eddy current sensor. Magnetic gas turbine sensors monitor the movement through a magnetic or electric field of metal objects such as turbine blades or the teeth of a phonic wheel. That movement then creates magnetic and/or electric effects which can be monitored.

A magnetic gas turbine sensor is illustrated schematically in FIG. 2. The sensor 1 shown in FIG. 2 consists of a permanent magnet 2 attached to a pole piece 3, and a coil 4 wound around the pole piece 3. An output signal 8 is generated when the magnetic field strength within and around the pole piece changes. This is caused by the approach and passing of ferrous metal teeth 5 on a phonic wheel 6 near the pole piece. The alternating presence and absence of ferrous metal teeth on the phonic wheel varies the reluctance, or "resistance of flow" of the magnetic field, which dynamically changes the magnetic field strength. This change in magnetic field strength induces a current into a coil winding which is attached to the output terminals 7. The output signal 8 of a VR sensor is an AC voltage that varies in frequency that is directly proportional to the speed of the monitored target.

One complete waveform (cycle) occurs as each tooth of the wheel passes the sensing area (pole piece) of the sensor. The frequency of the signal, and so the speed of rotation, is determined from the zero crossing times of the signal. But typically the sensor "sinusoidal like" voltage output is required to cross zero volts and reach a minimum voltage either side of zero, for a reliable speed reading to be obtained. This minimum voltage requirement avoids electrical noise causing false readings.

The same basic principle is equally applicable for the measurement of rotational speed via a direct monitoring of the passage of, for example turbine blades past an eddy current sensor (i.e. reluctance sensor) as described in EP2073021. The time between the passages of adjacent blades past a sensor can be measured to provide a signal from which rotational speed can be calculated.

Both the conventional type of variable reluctance sensor, where many turns of a conductive wire are wrapped around a magnetic pole piece, and the transformer type as described in EP 1 355 131 and EP 0 169 670, where, respectively, a few turns of a primary turn of conductive wire or an elongate strip with a slot defining a single turn are wrapped around magnetic pole piece, can be used. FIGS. 3a and 3b are schematic cross sections of two typical constructions of a variable reluctance sensor.

The sensor of FIG. 3a comprises a magnetic pole piece 3 around which an electrically conductive wire 4 is wound. A permanent magnet 2 is positioned adjacent a back face of the pole piece. The front face of the pole piece is, in use, located proximate to the phonic wheel 6 or wheels being sensed, as shown, for example, in FIG. 1. The pole piece 3, conductive wire 4 and permanent magnet 2 are all held in a housing (not shown in FIG. 3a). An encapsulation material, typically a powder or an epoxy resin, is used to fill the space between the housing and the pole piece, magnet and conductive wire. The housing is fixed to another part of the turbine engine (not shown) and ensures that the front face of the pole piece is correctly positioned relative to the phonic wheel or wheels. The housing also provides protection from the harsh environment found inside gas turbine engines.

As each tooth 5 of the phonic wheel 6 passes close to the front face 9 of the pole piece 3 there is a change in the magnetic flux experienced by the conductive wire 4, due to the change in the reluctance of the magnetic circuit consisting of the pole piece, the phonic wheel and the air gap between the two. The changing magnetic flux results in a variable current induced in the conductive wire, from which the timing of the passage of the teeth on the phonic wheels past the pole piece can be determined.

The alternative sensor construction of FIG. 3b is a transformer probe sensor of the type described in EP 0 169 670 and EP 1 3 55 131. A probe for sensing movement of a body of magnetic material comprises a magnetically energisable pole piece 3, a closed loop electrical circuit 10 having a first end which is wound around the pole piece 3 and forms a pole piece coil 4 inductively coupled to the pole piece, the arrangement being such that movement of a body of magnetic material (e.g. the teeth of a phonic wheel) relative to the pole piece induces a current in the closed loop circuit, and a second end, remote from the pole piece, which forms a transformer primary coil 11. A transformer secondary coil 12 is inductively coupled to the primary coil 11, and terminated by a load resistance and means for measuring an output signal from the secondary coil. The primary and secondary coils form a transformer such that a current in the primary coil induces a voltage across the secondary coil.

Speed probes measure a gas turbine shaft speed. Very often a gas turbine has two or three shafts which are very difficult to access. The most difficult shaft to access is the inner shaft. This is the shaft connecting the fan with the low pressure turbine. Very often this shaft can only be accessed at the rear end of the turbine. However to reach the phonic wheel on the shaft the speed probe would have to pass through or be placed in the gas exhaust. The temperature of the exhaust gas is still very high, and could be about 700° C. or more.

Speed probes have two temperature sensitive components: a magnet and a pole piece. The operating temperature of these magnetic materials depends on their Curie temperature above which they lose their magnetic properties. There are magnets, such as ALNICO (family of iron alloys which in addition to iron are primarily composed of aluminium, cobalt and nickel and may also include copper and titanium) which have can operate up to 1000° C., but their strength is limited. It means that to obtain a sufficient magnetic flux at the air gap between the wheel and the pole piece they would have to be very large and bulky.

Very often there is not enough space inside the probe to accommodate such large magnets and a different type of magnetic material must be used. However, such magnetically strong magnets as for example samarium cobalt have Curie temperatures or about 350° C. Therefore they can only be used at much lower temperatures and are not suitable for placing in the exhaust gas region of a jet engine.

Another component which performance deteriorates with temperature is a coil. Insulation of coil wires, such as polyimide can operate up to 250 C. There are available ceramic coated wires, but they are not suitable for high vibration environments. Transformer probes of the sort described in EP 0 169 670 can be used in higher temperature environments as they can use a strip of material which is less affected by temperature than the thin coils of magnetic material such as those used in conventional variable reluctance sensors. Ceramic coated coils have also been proposed for higher temperature environments.

BRIEF SUMMARY OF EMBODIMENTS OF THE INVENTION

The inventors of the subject application have appreciated that it is possible to provide a variable reluctance sensor able to better perform at higher temperatures without a significant increase in size of the sensor by providing a cooling mechanism for one or more of the sensor's magnetic elements and integrating that into the sensor.

The present invention, in a first aspect, provides a magnetic gas turbine sensor for sensing the speed and/or torque of a shaft in a gas turbine engine, the sensor comprising: a magnetic pole piece; a magnet associated with the pole piece; a conductive sensing element wrapped or wound around the pole piece and inductively coupled to the pole piece; and a first sensor casing housing surrounding and housing the pole piece, and magnet and conductive sensing element; the first sensor casing including first inner fluid conduit for fluid coolant, the first fluid conduit being inside the casing housing and running alongside and/or adjacent the pole piece, magnet and/or conductive sensing element, the sensor also including a second sensor casing surrounding the first sensor casing and defining a second outer fluid conduit for fluid coolant and at least partially surrounding the first fluid channel, wherein the sensor includes a first distal sensing end adjacent the pole piece for location adjacent the path of the shaft or an element rotating with the shaft, and a second proximal mounting end for mounting to a surface on or adjacent the engine, and wherein the first fluid conduit has a fluid inlet towards the proximal mounting end of the sensor, the second fluid conduit has a fluid outlet towards the proximal mounting end of the sensor, and the first and second fluid conduits in communication with each other at the distal sensing end of the sensor such that fluid coolant may flow into the sensor at its proximal mounting end, through the first fluid conduit over the pole piece, magnet and/or conductive sensing element to the sensing end, and then through the second fluid conduit from the distal sensing end to the outlet at the proximal mounting end.

Such an arrangement allows for more efficient cooling of the sensor pole piece and hence provides a sensor able to operate at higher temperatures.

Cooling is made more efficient by cooling fluid being inside the sensor body and in direct or close contact with the magnet, pole piece and/or conductive sensing element requiring coding. The provision of two cooling layers by the presence of the inner and outer fluid conduits means fluid flowing inside the probe or sensor through the inner conduit is protected from heat by the fluid flowing in the second fluid channel.

The magnetic gas turbine sensor could be an eddy current sensor.

The magnetic gas turbine sensor could be a variable reluctance sensor.

The internal walls of the first sensor casing could define the first fluid conduit.

Preferably the first sensor casing is configured such that fluid coolant flowing therethrough is in contact with the pole piece, magnet and/or conductive sensing element.

Preferably the first sensor casing is configured such that fluid coolant flowing therethrough is in contact with the pole piece, magnet and conductive sensing element Preferably the first sensor casing is configured such that fluid coolant flowing therethrough is in direct contact with the pole piece, magnet and/or conductive sensing element.

Preferably the sensor includes a mounting head portion for mounting the sensor to an engine casing or fixture and wherein the mounting head portion includes a fluid inlet connected to the fluid inlet of the first inner fluid conduit and a fluid outlet connected to the fluid outlet of the second outer fluid conduit each connected to respective ends of the fluid conduit.

Preferably the second fluid conduit surrounds and is substantially concentric with the first fluid conduit.

Preferably the magnet includes cooling fins arranged around its circumference and around through which coolant may flow.

Preferably the sensor includes a non-magnetic heat sink block surrounding the magnet and/or pole piece.

Preferably the non-magnetic heat sink block includes cooling fins.

The invention, in a second aspect, provides a magnetic gas turbine sensor for sensing the speed and/or torque of a shaft in a gas turbine engine, the sensor comprising: a magnetically energisable pole piece; a magnet associated with the pole piece; a tubular conductive sensing element wrapped or wound around the pole piece and inductively coupled to the pole piece such that movement of a body of magnetic material relative to the pole piece induces current in the tubular conductive sensing element, the tubular conductive sensing element also defining a conduit for coolant; a sensor housing surrounding the pole piece, magnet and tubular conductive sensing element and wherein the sensor further comprises an electrically conductive fluid inflow tube connected at a first end to a fluid inlet in a portion of the sensor remote from the magnet and pole piece, and a second end connected to a first end of the tubular conductive sensing tube; an electrically conductive fluid outflow tube connected at a first end to a fluid outlet in a portion of the sensor remote from the magnet and pole piece, and a second end connected to a second end of the tubular conductive sensing tube; wherein the first ends of the respective fluid inflow and outflow tubes are electrically connected; and wherein the closed electrical circuit formed by the fluid inflow tube, fluid outflow tube and sensing tube are magnetically coupled to a secondary coil of conductive material.

Preferably the closed electrical circuit formed by the fluid inflow tube, fluid outflow tube and sensing tube forms a sensing circuit for sensing movement of a body of magnetic material and includes a first portion which is inductively coupled to the pole piece, the arrangement being such that movement of a body of magnetic material relative to the pole piece induces a current in the sensing circuit, and a second portion, remote from the pole piece, which forms a transformer primary coil, and the secondary coil of magnetic material is inductively coupled to the primary coil formed by the second portion of the sensing circuit and includes a load resistance, and wherein the primary and secondary coils form a transformer such that a current in the sensing circuit induces a voltage across the secondary coil.

The sensor may include a source of liquid coolant connected to the fluid conduit or conduits.

The sensor may include a pump for pumping liquid coolant through the fluid conduit or conduits.

The sensor may include means for pressurising coolant in the fluid conduit or conduits.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTIONS OF DRAWINGS

Embodiments of the invention will be further described, by way of example only, with reference to the accompanying drawings in which.

DETAILED DESCRIPTION OF EMBODIMENTS OF THE INVENTION

Figure 1:
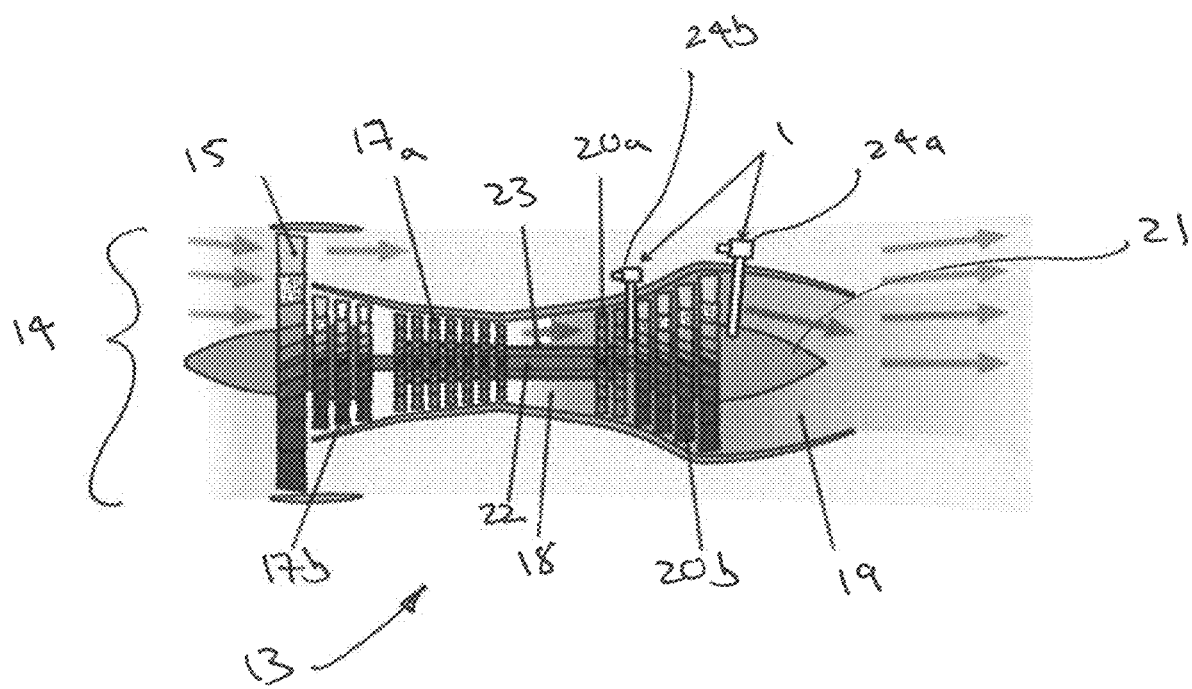
FIG. 1 is a schematic cross-section through a jet engine or gas turbine showing possible locations of magnetic speed and/or torque sensing probes.
Figure 2:
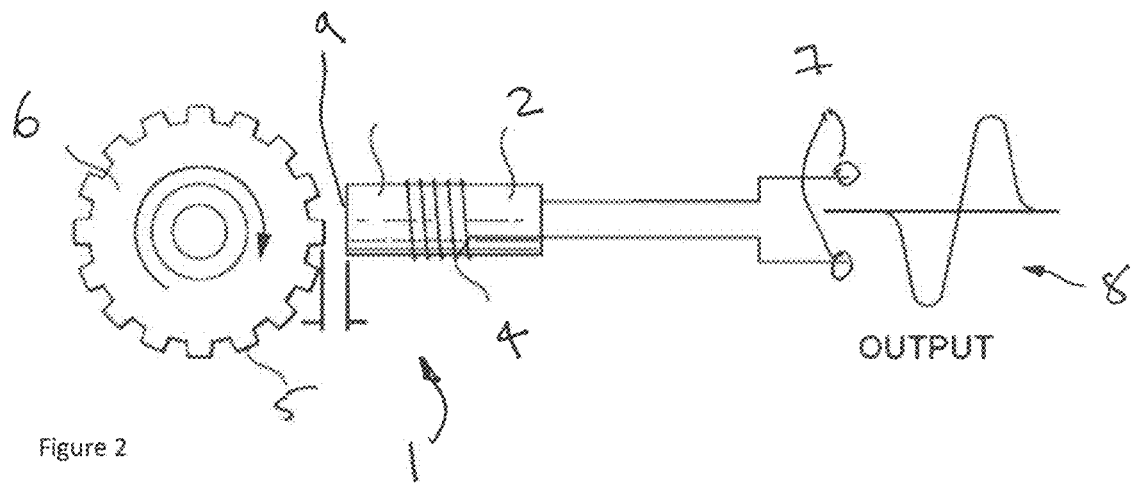
FIG. 2 is a schematic illustration of a magnetic variable reluctance (VR) sensing probe.

FIG. 1 shows a typical two spool turbo fan jet engine 13 having an intake 14, fan 15, high pressure compressor 17a, low pressure compressor 17b, combustion chamber 18, fan nozzle 19, high pressure turbine 20 a, and low pressure turbine 20b and cone 21. The construction of such jet engines is well known so will not be described in detail.

The engine 13 includes a fan 15 across the air intake 14. The fan 15 is mounted on an inner shaft 22 on which are also mounted the low pressure turbine rotors or blades 20 as well as the low pressure compressor rotors or blades. The high pressure turbine and compressor rotors or blades are mounted on an outer high pressure shaft 23.

In order to measure the speed of the inner or low pressure shaft 22 a phonic wheel (not shown) may be placed on the low pressure shaft behind the cone 21 or as the last thing inside the cone 21. An inner shaft speed sensor 24a is mounted on the engine casing with the sensing end adjacent that inner shaft phonic wheel.

In order to sense the speed of the outer shaft 23 supporting the high pressure turbine and compressor, a phonic wheel (not shown) may be placed on the outer shaft 23 between the locations of the high and low pressure turbine rotors or blades. An outer shaft speed sensor 24b is mounted on the engine casing with the sensing end adjacent that outer shaft phonic wheel.

The cone 21 is in the exhaust from the engine or turbine and therefore is, when the jet engine is in use, a high temperature environment. Temperatures in the engine can exceed 800° C. which means that the environment in which the inner shaft speed sensor 24a should be located is an aggressive one. Furthermore and as can be seen from FIG. 1, space is limited in the engine for the speed sensor.

Figure 3A:
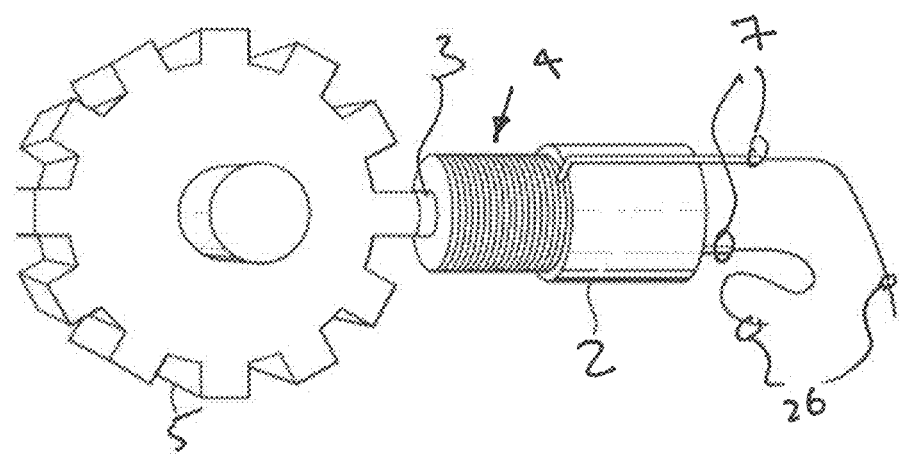
FIG. 3a illustrates a variable reluctance probe positioned adjacent to a phonic wheel.
Figure 3B:
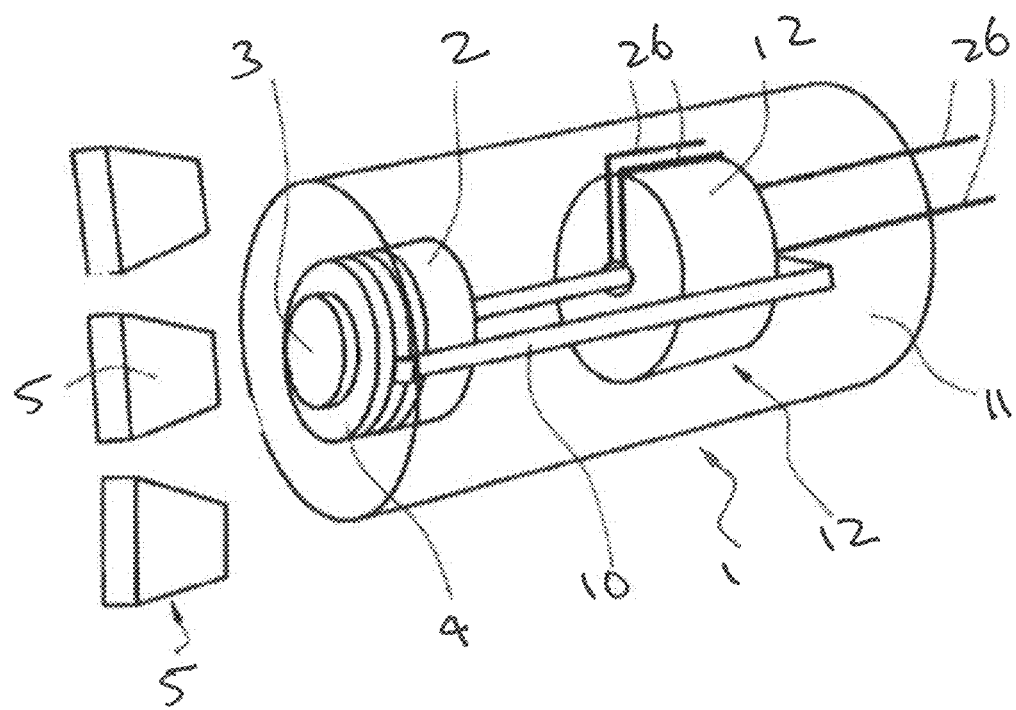
FIG. 3b illustrates an alternative variable reluctance transformer probe positioned adjacent to a phonic wheel.

There are two types of speed sensors which may require different cooling systems. One type is that described above in connection with, and shown in, FIG. 3a and using standard multi turn coils. The second type is that described above in connection with, and shown in, FIG. 3b and using a transformer probe and a primary turn.

Referring to FIGS. 4 to 7, a sensor probe 25 comprises a magnet 2, pole piece 3, coil 4 wound around the pole piece 3 and including leads 26 connecting the respective ends of the coil 4 to sensing circuitry (not shown) coupled to a mounting head 27. The probe 25 is held within a probe body or housing 28 which may be made of a nickel alloy such as Inconel 600. Inconel is a registered trade mark of Huntington Alloy Corporation. Inconel 600 is a nickel-chromium alloy with oxidation resistance at high temperatures and is used for, inter alia, furnace components. More information on Inconel 600 can be found at http://www.hightempmetals.com/techdata/hitempInconel600data.php. The mounting head 27 may also be of Inconel 600 (or similar) or of a ceramic material as described in EP 2 023 106.

The sensor housing or body 28 has a first distal end 29 with a sensing face 30 through which the pole piece 3 projects and which forms the sensing end of the probe. The proximal end 31 of the sensor housing includes the mounting head 27 which can be mounted to the engine casing and which has a connector element 32 for connecting the sensor leads 26 to sensing circuitry. Details of the connections to the sensing circuitry may be as described in EP 2 023 106.

The mounting head includes a gas or fluid inlet 33 and a gas or fluid outlet 34 which are connected to a fluid conduit or 35 which extends from the inlet 33 in the mounting head 27 to, and around, the magnet 2 and sensing coil 4 and then back to the fluid outlet 34. Arrows A and B show the direction of fluid flow from the inlet 33 to the outlet 34. The inflow A is cooler than the outflow B: coolant fluid such as air is heated up by and transports heat away from the magnet 2, pole piece 3, coil 4 and probe housing 28 as it flows through the probe 25.

The first portion of the fluid or cooling passage running from the fluid inlet 33 to the magnet 2 is a central or inner inflow conduit 36 running down the middle of the sensor housing 28. The magnet, pole piece and coil making up the sensing element are located within the inner conduit 36. Concentric with the inner inflow conduit is a concentric outflow outer conduit 37 disposed around the inner inflow conduit and connected thereto by a space 38 at the bottom or distal end of the probe 25 between the bottom of the wall of the central inflow passage and the end or bottom surface of the probe or sensor housing (i.e. at the sensing end of the probe). Alternatively channel/holes may be provided in the walls of the distal or bottom end of the central inner conduit 36. The outflow conduit 37 includes a first distal section 39 adjacent the sensing element which is broader than the second proximal elements connecting the distal section to the fluid outlet in the mounting head. The walls of the fluid passages may (like the rest of the housing) be made from Inconel 600.

Figure 4:
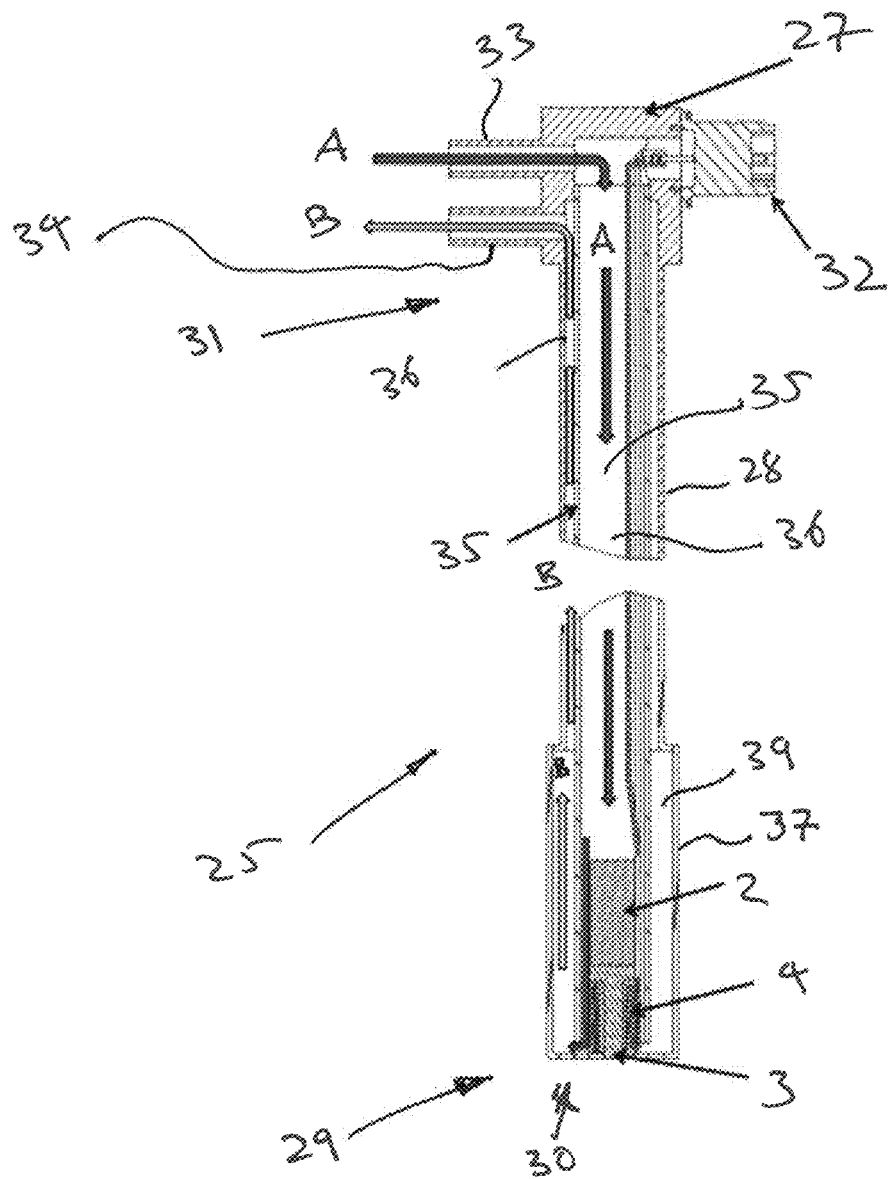
FIG. 4 is a schematic illustration of a first embodiment of the invention.
Figure 6:
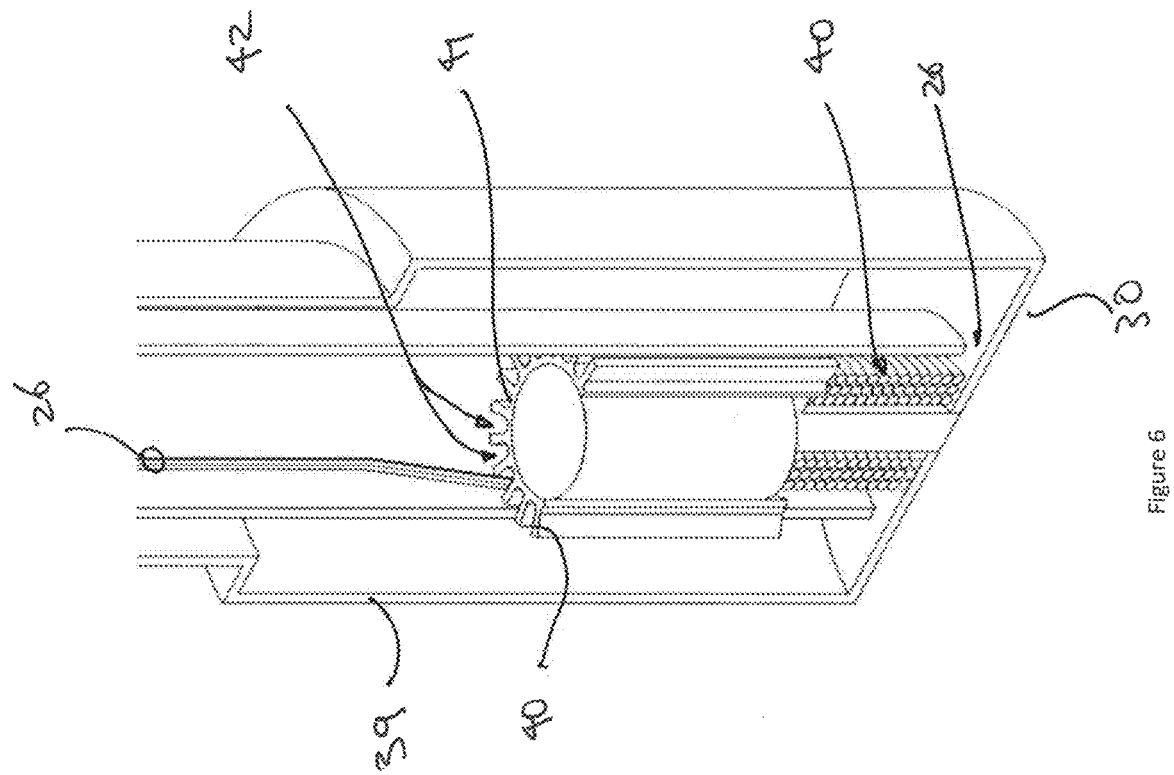
FIG. 6 is an illustration of an alternative magnet construction for use in embodiments of the invention.
Figure 5:
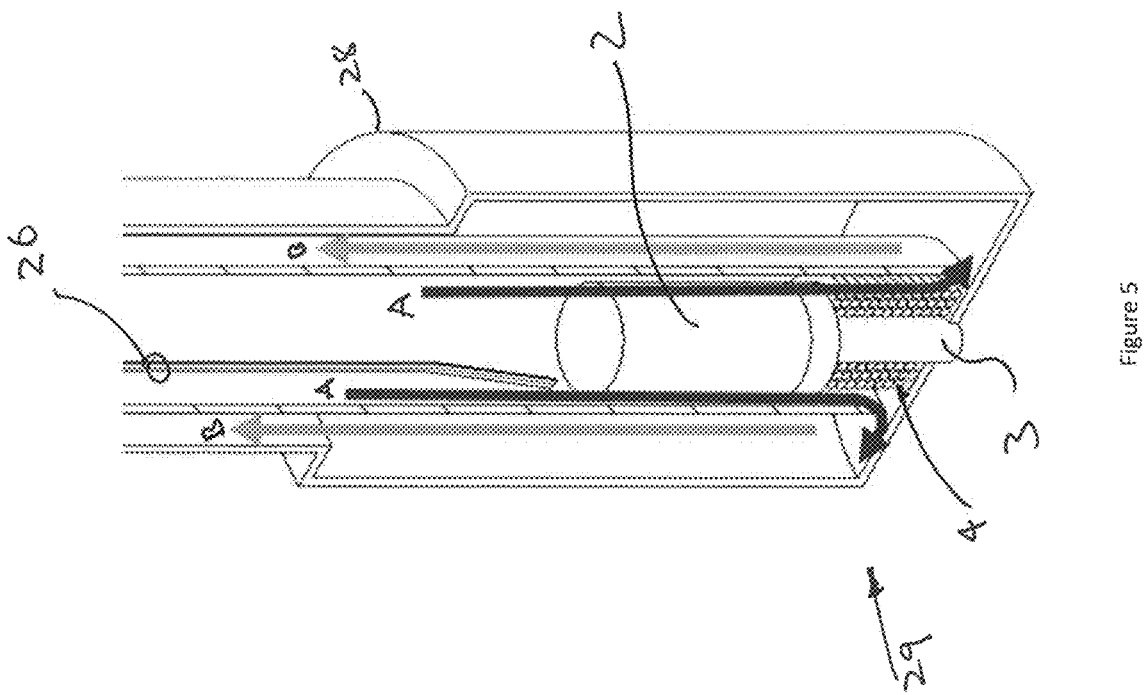
FIG. 5 is an illustration of the bottom (sensing end) of the probe of FIG. 4.

In the embodiment shown in FIGS. 4 to 6, the magnet 2 may be a rare earth magnet such as a samarium cobalt magnet; the pole piece 3 may be made of a soft magnetic material such as iron or magnetic stainless steel; the coil 4 may be made from copper wire with polyamide insulation; whilst the walls of the fluid passages 36,37, mounting head 27 and sensor housing 28 may all be made of Inconel 600 or something similar capable of withstanding the high temperatures in which the sensor or probe 25 will be placed and operate.

A cooling fluid may be provided to the probe housing 25 through the special fluid inlet 33 and flows in the central part of the probe 25 which defines an inflow passage 36 to the magnet 2, pole piece 3 and coil 4. The fluid then returns in the outside cavity of the probe which defines the outflow passage 37. Since the heat source (hot exhaust gas for probe placed in exhaust of turbine) would be normally located outside, at half length of the probe, the cooling fluid, after absorbing this heat travels upwards directly to the exhaust. The flow is determined empirically for various engine-speed probe configurations. The cooling fluid could be air taken from the engine bypass, or air or another gas from a special compressor. However liquid coolant will have a higher specific heat components meaning a smaller volume of coolant would be suitable. In view of the size constraints of a magnetic sensor non-conductive liquid coolants may be preferred. A suitable cooling fluid would be a non-conductive fluid such as a dielectric fluid such as that available from 3M under the trade mark FLOURINET. Fluorinert is the trademarked brand name for the line of electronics coolants liquids sold commercially by 3M. It is an electrically insulating, stable fluorocarbon-based fluid, which is used in various cooling applications. It is mainly used for cooling electronics. Different molecular formulations are available with a variety of boiling points, allowing it to be used in "single-phase" applications, where it remains a liquid, or for "two-phase" applications, where the liquid boils to remove additional heat by evaporative cooling. An example of one of the compounds 3M uses is FC-72 (perfluorohexane, C6F14). Perfluorohexane is used for low-temperature heat-transfer applications due to its 56° C. (133° F.) boiling point. Another example is FC-75, perfluoro (2-butyl-tetrahydro-furane). There are 3M fluids that can handle up to 215° C. (419° F.), such as FC-70 (perfluorotripentylamine). Other suitable coolants include distilled water, Novec 1230 (a fluorinated ketone manufactured by 3M), Fluid XP+ (a series of coolants manufactured by Fluid XP+), or oil. The liquid coolant could be pressurised so as to operate at higher temperatures.

Figure 7:
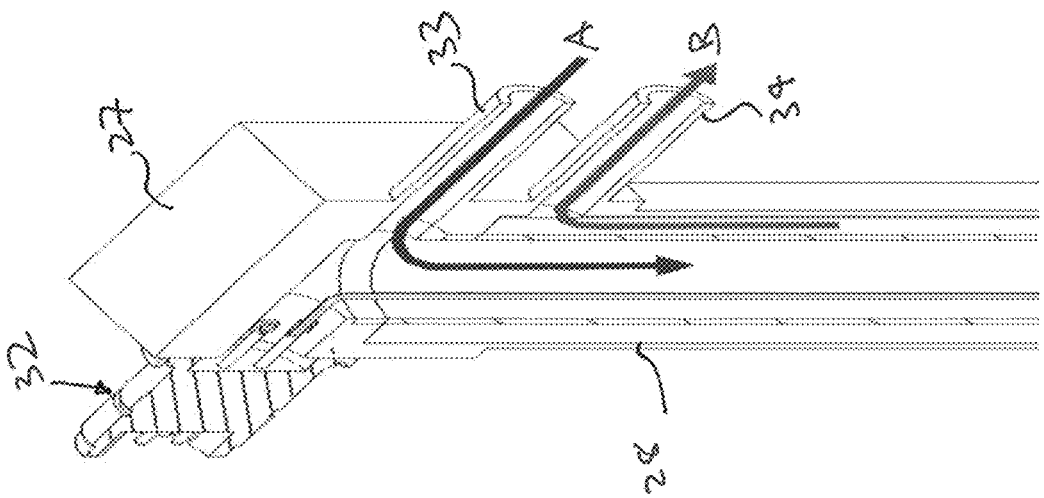
FIG. 7 illustrates the top (mounting end) of the probe of FIG. 4.

To enhance cooling of the magnet special cooling fins 40 may be mounted on the outside of the magnet 2 as shown in FIG. 7. A number of radially projecting cooling fins 40 are mounted on an annular element 41 which surrounds the magnet 2 and coil 4 which each have circular cross-sections. The cooling fins 40 and supporting annular element 41 are made of a good conductor of heat such as copper so as to help the conduction of heat from the magnet 2 and coil 4 to the cooling fins 40 and thence to the cooling fluid or gas which flows over the cooling fins and in the channel 42 formed between adjacent fins.

Figure 8:
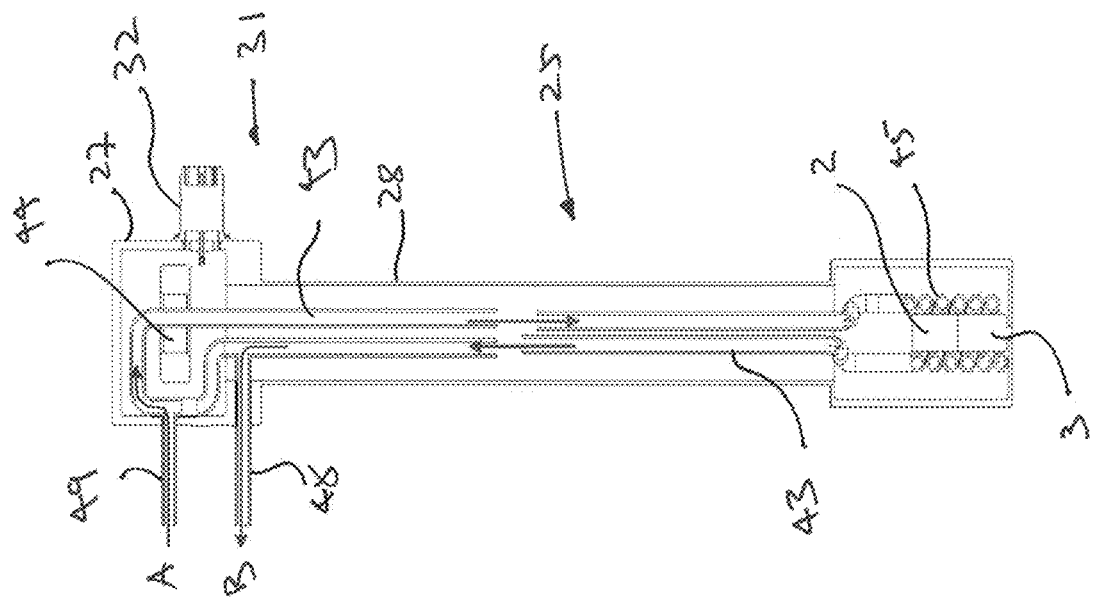
FIG. 8 is a schematic illustration of a second embodiment of the invention.

Referring to FIG. 8, in an alternative embodiment of the invention including a transformer probe type sensor of the type described above in connection with FIGS. 3a and 3b, the sensing probe 25 includes a mounting head 27, an Inconel 600 alloy sensor or probe housing 28, a permanent magnet 2 (which may be a rare earth magnet such as a samarium cobalt magnet), a pole piece 3 of soft magnetic material (for example, iron or magnetic stainless steel) adjacent the magnet and a hollow tube 43 also of Inconel 600. The tube 43 must be strong enough to withstand vibration. An alternative would be a thick wall copper tube forming both the loop and primary coil of a transformer probe of the type described above with reference to FIG. 4b, and passage or conduit for cooling fluid.

Figure 10:
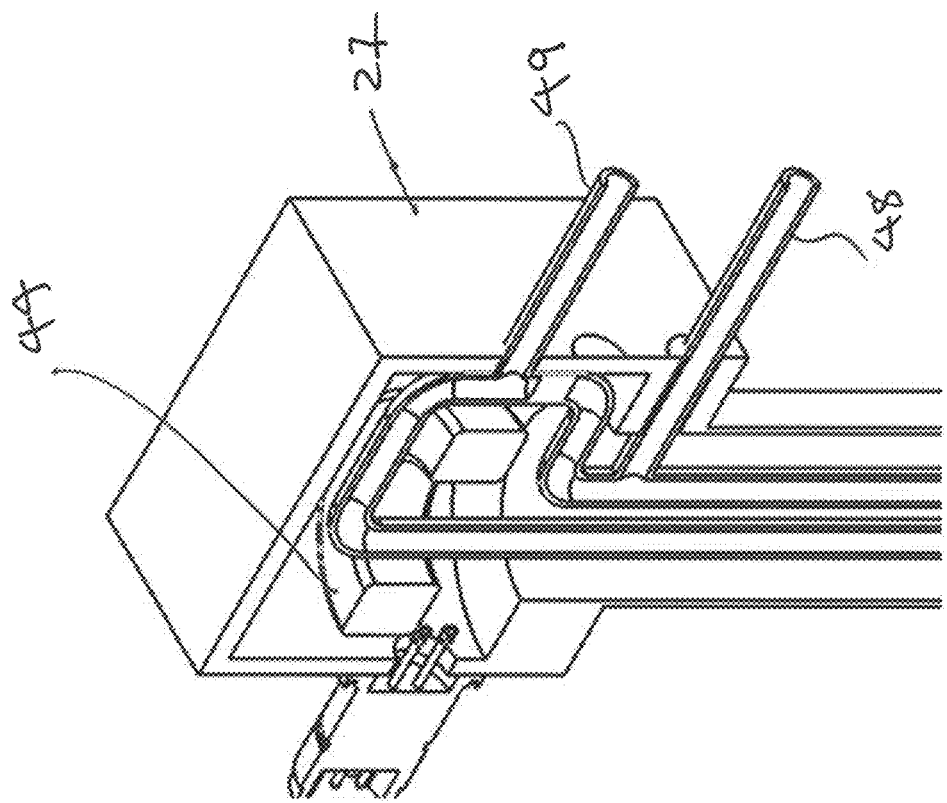
FIG. 10 illustrates the top (mounting end) of the probe of FIG. 8.
Figure 9:
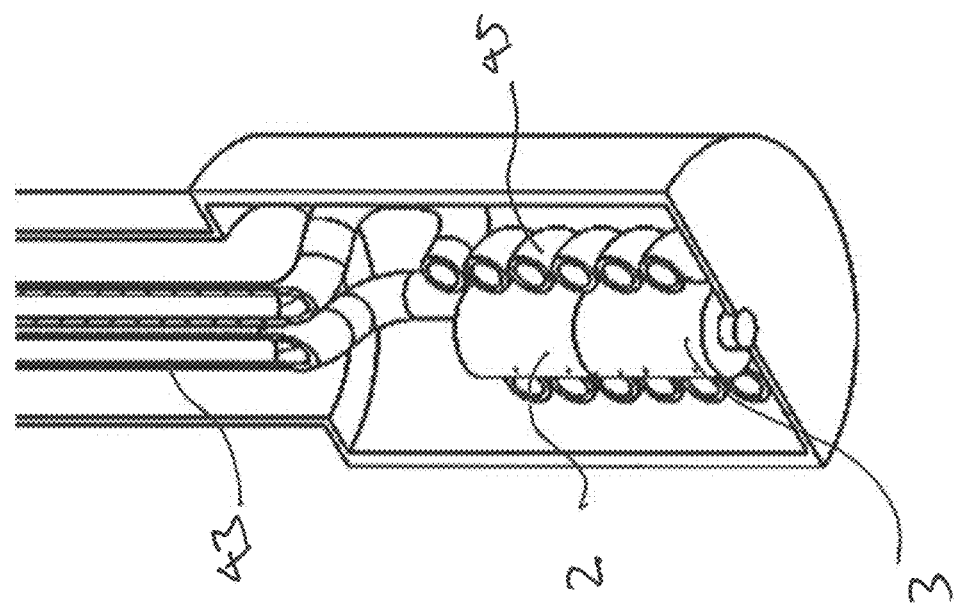
FIG. 9 illustrates the bottom (sensing end) of the probe of FIG. 8.

Arrangements for cooling of a transformer probe are shown in FIGS. 8 to 10. In these arrangements cooling fluid which could be liquid or gas travels inside the primary turn which is the pipe or tube 43. Possible coolants include the liquid coolants discussed above.

While the primary turn forms an electric loop, the fluid flow is blocked at the top part directing flow to the exit or outlet 48. To enhance magnet cooling the primary turn might be wound around the magnet if necessary. The primary turn could also be made from copper or other good heat conductors. The flow through the pipe is established empirically.

The hollow Inconel 600 conductive tube 43 forms a continuous path or loop which at the probe mounting end 31 passes through a secondary coil 44 of a copper alloy winding at the head end or mounting end of the probe to form a transformer therewith, and then runs to and from a coiled tube section 45 formed of a good conductor such as copper coiled around the pole piece 3. The portion of the tube within the mounting head also includes a fluid inlet 49 and a fluid outlet 48 passage for, respectively, supplying cooling fluid to and taking heated up cooling fluid from the sensing probe. The probe housing may also be of Inconel 600. The mounting head includes electrical insulation so that current induced in the conductive tube 43 does not flow out of the mounting head along the fluid inlet 33 and outlet 34 passages as these enter and exit the sensor mounting head.

Figure 11:
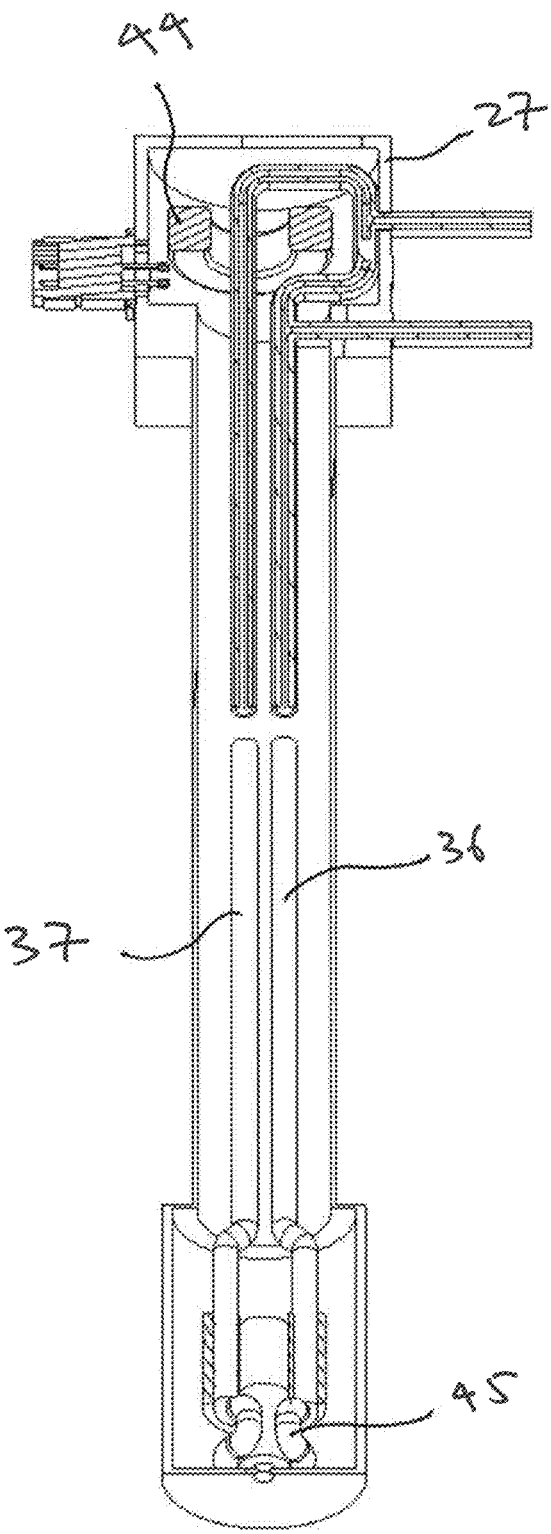
FIG. 11 is a cross-sectional schematic illustration of a third embodiment of the invention.
Figure 12A:
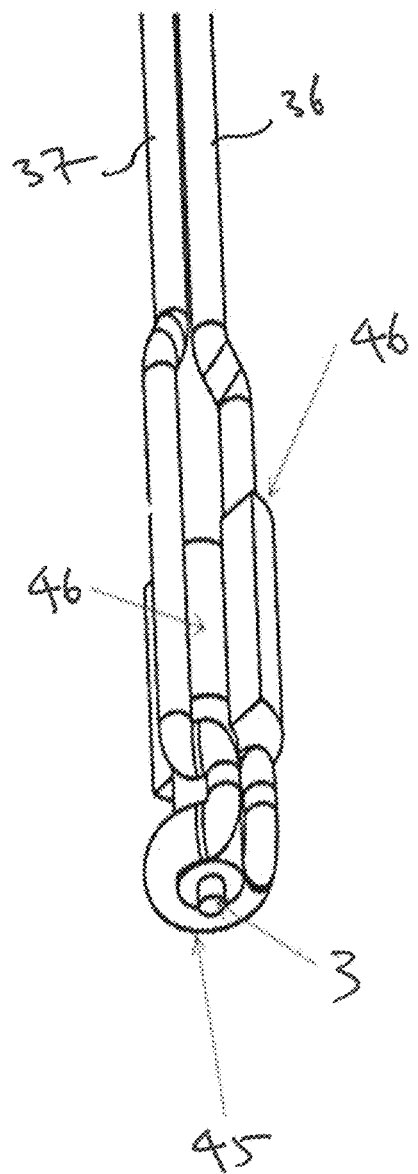
FIGS. 12a and 12b are, respectively, a partial perspective view and a perspective view of the sensing end of the probe of FIG. 11 with the external casing removed.
Figure 12B:
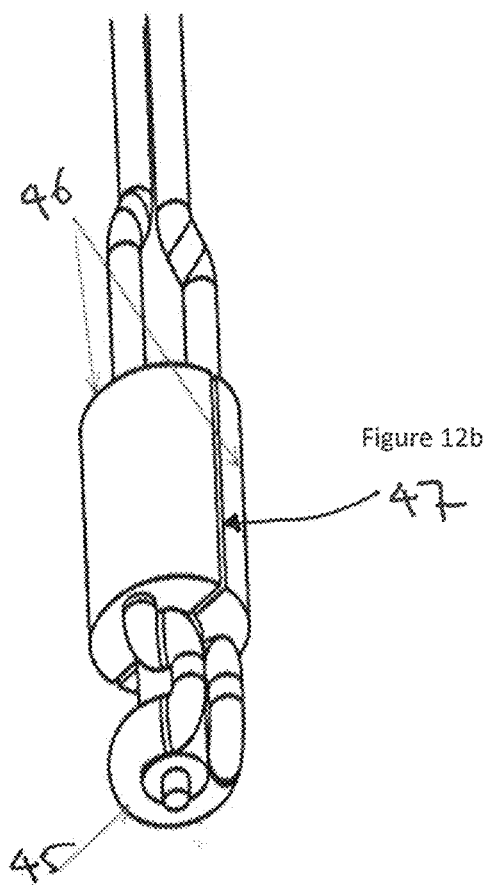

In an alternative embodiment shown in FIGS. 11 to 13, a pair of separated and complementary non-magnetic heat sinks 46 are arranged around the circumference of the magnet 2 and the fluid passages 36,37 (defined by the hollow tube 43) as they pass the magnet 2. The heat sinks 46 are made of a good conductor of heat such as copper or a copper alloy. There is a gap 47 between the heat sinks to prevent the metal heat sinks from acting to short circuit the secondary coil 44 and thereby prevent the transformer probe from acting effectively. The heat sinks 46 help the transfer of heat between the fluid in the fluid passages 36, 37 defined by the hollow tube 43, and the sensing end 29 of the probe (which includes the magnet, pole piece 3 and bottom end of the conductive tube 43 defining the fluid passageways).

The invention claimed is:

1. A magnetic gas turbine sensor for sensing the speed and/or torque of a shaft in a gas turbine engine, the sensor comprising:
    a magnetic pole piece;
    a magnet associated with the pole piece;
    a conductive sensing element wrapped or wound around the pole piece and inductively coupled to the pole piece; and a first sensor casing surrounding and housing the pole piece, magnet and conductive sensing element;

the first sensor casing including a first inner fluid conduit for fluid coolant, the first fluid conduit being inside the casing and running alongside and/or adjacent the pole piece, magnet and/or conductive sensing element, the sensor also including a second sensor casing surrounding the first sensor casing and defining a second outer fluid conduit for fluid coolant and at least partially surrounding the first fluid conduit, wherein the sensor includes a first distal sensing end adjacent the pole piece for location adjacent the path of the shaft or an element rotating with the shaft, and a second proximal mounting end for mounting to a surface on or adjacent the engine, and wherein the first fluid conduit has a fluid inlet towards the proximal mounting end of the sensor, the second fluid conduit has a fluid outlet towards the proximal mounting end of the sensor, and the first and second fluid conduits are in communication with each other at the distal sensing end of the sensor such that fluid coolant may flow into the sensor at its proximal mounting end, through the first fluid conduit over or through the pole piece, magnet and/or conductive sensing element to the sensing end, and then through the second fluid conduit from the distal sensing end to the outlet at the proximal mounting end.

2. The magnetic gas turbine sensor according to claim 1 wherein internal walls of the first sensor casing define the first fluid conduit.

3. The magnetic gas turbine sensor according to claim 1 wherein the first sensor casing is configured such that fluid coolant flowing therethrough is in contact with the pole piece, magnet and/or conductive sensing element.

4. The magnetic gas turbine sensor according to claim 3 wherein the first sensor casing is configured such that fluid coolant flowing therethrough is in direct contact with the pole piece, magnet and/or conductive sensing element.

5. The magnetic gas turbine sensor according to claim 1 further comprising a mounting head portion for mounting the sensor to an engine casing or fixture and wherein the mounting head portion includes a mounting head fluid inlet connected to the fluid inlet of the first fluid channel and a mounting head fluid outlet connected to the fluid outlet of the second fluid channel.

6. The magnetic gas turbine sensor according to claim 1 wherein the second outer fluid conduit surrounds and is substantially concentric with the first inner fluid conduit.

7. The magnetic gas turbine sensor according to claim 1 wherein the magnet includes cooling fins arranged around its circumference and over which coolant may flow.

8. The magnetic gas turbine sensor according to claim 1 further comprising a non-magnetic heat sink block surrounding the magnet and/or pole piece.

9. The magnetic gas turbine sensor according to claim 8 wherein the non-magnetic heat sink block includes cooling fins.

10. A magnetic gas turbine sensor for sensing the speed and/or torque of a shaft in a gas turbine engine, the sensor comprising:
   a magnetically energisable pole piece;
   a magnet associated with the pole piece;
   a tubular conductive sensing element wrapped or wound around the pole piece and inductively coupled to the pole piece such that movement of a body of magnetic material relative to the pole piece induces current in the tubular conductive sensing element, the tubular conductive sensing element also defining a conduit for coolant;
   a sensor housing surrounding the pole piece, magnet and tubular conductive sensing element and wherein the sensor further comprises an electrically conductive fluid inflow tube connected at a first end to a fluid inlet in a portion of the sensor remote from the magnet and pole piece, and a second end connected to a first end of the tubular conductive sensing tube;
   an electrically conductive fluid outflow tube connected at a first end to a fluid outlet in a portion of the sensor remote from the magnet and pole piece, and a second end connected to a second end of the tubular conductive sensing tube;
   wherein the first ends of the respective fluid inflow and outflow tubes are electrically connected; and
   wherein the closed electrical circuit formed by the fluid inflow tube, fluid outflow tube and sensing tube are magnetically coupled to a secondary coil of conductive material.

11. The magnetic as turbine sensor according to claim 10 wherein the closed electrical circuit formed by the fluid inflow tube, fluid outflow tube and sensing tube forms a sensing circuit for sensing movement of a body of magnetic material and includes a first portion which is inductively coupled to the pole piece, the arrangement being such that movement of a body of magnetic material relative to the pole piece induces a current in the sensing circuit, and a second portion, remote from the pole piece, which forms a transformer primary coil, and the secondary coil of magnetic material is inductively coupled to the primary coil formed by the second portion of the sensing circuit and includes a load resistance, and wherein the primary and secondary coils form a transformer such that a current in the sensing circuit induces a voltage across the secondary coil.

12. The magnetic gas turbine sensor according to claim 10 including a source of liquid coolant connected to the fluid conduit or conduits.

13. The magnetic gas turbine sensor according to claim 12 including a pump for pumping the liquid coolant through the fluid conduit or conduits.

* * * * *